(12) United States Patent
Powell

(10) Patent No.: US 9,494,726 B2
(45) Date of Patent: Nov. 15, 2016

(54) SWITCHABLE BACKLIGHT UNIT

(71) Applicant: MICROSOFT TECHNOLOGY LICENSING, LLC, Redmond, WA (US)

(72) Inventor: Karlton David Powell, Lake Stevens, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 195 days.

(21) Appl. No.: 14/288,242

(22) Filed: May 27, 2014

(65) Prior Publication Data

US 2015/0346417 A1 Dec. 3, 2015

(51) Int. Cl.
*F21V 8/00* (2006.01)

(52) U.S. Cl.
CPC ........... *G02B 6/0051* (2013.01); *G02B 6/0046* (2013.01); *G02B 6/0061* (2013.01); *G02B 6/0021* (2013.01); *G02B 6/0028* (2013.01); *G02B 6/0055* (2013.01); *G02B 6/0068* (2013.01)

(58) Field of Classification Search
CPC . G02B 6/0051; G02B 6/0046; G02B 6/0061
See application file for complete search history.

(56) References Cited

U.S. PATENT DOCUMENTS

| 6,023,369 | A  | 2/2000  | Goto |
| 6,381,068 | B1 | 4/2002  | Harada et al. |
| 7,400,817 | B2 | 7/2008  | Lee et al. |
| 7,443,583 | B2 | 10/2008 | Yamauchi |
| 7,660,047 | B1 | 2/2010  | Travis et al. |
| 7,742,230 | B2 | 6/2010  | Uchida et al. |
| 7,991,257 | B1 | 8/2011  | Coleman |
| 8,251,563 | B2 | 8/2012  | Papakonstantinou et al. |
| 8,467,133 | B2 | 6/2013  | Miller |
| 8,565,560 | B2 | 10/2013 | Popovich et al. |

(Continued)

FOREIGN PATENT DOCUMENTS

| DE | 112012002308 T5 | 2/2014 | |
| GB | 2348040 A * | 9/2000 | ....... G02F 1/133504 |

(Continued)

OTHER PUBLICATIONS

ISA European Patent Office, International Search Report and Written Opinion issued in Application No. PCT/US2015/023230, Jul. 9, 2015, WIPO, 11 pages.

(Continued)

*Primary Examiner* — Elmito Breval
(74) *Attorney, Agent, or Firm* — Brandon Roper; Judy Yee; Micky Minhas

(57) ABSTRACT

Embodiments for a backlight unit are provided. In one example, a backlight unit comprises a light guide configured to receive light at a first light interface located at an end of the light guide and output light via a second light interface located at a face of the light guide, and a plurality of light sources configured to inject light into the light guide at the first light interface. The example backlight unit also comprises a graded index film configured to receive light from the second light interface of the light guide, homogenize received light that is incident on the graded index film from within a range of acceptance angles and not homogenize light incident on the graded index film from outside of the range of acceptance angles, and direct the homogenized light toward an eye box.

20 Claims, 16 Drawing Sheets

(56) References Cited

U.S. PATENT DOCUMENTS

| | | |
|---|---|---|
| 2002/0158967 A1 | 10/2002 | Janick et al. |
| 2005/0225687 A1* | 10/2005 | Yamauchi ............ G03B 21/60 349/5 |
| 2006/0012767 A1 | 1/2006 | Komatsuda et al. |
| 2006/0077688 A1 | 4/2006 | Uehara et al. |
| 2006/0098279 A1 | 5/2006 | Yamauchi |
| 2006/0098280 A1 | 5/2006 | Yamauchi |
| 2007/0013624 A1 | 1/2007 | Bourhill |
| 2009/0067156 A1 | 3/2009 | Bonnett et al. |
| 2009/0152748 A1 | 6/2009 | Wang et al. |
| 2010/0026920 A1* | 2/2010 | Kim ............... H04N 13/0404 349/15 |
| 2010/0079861 A1 | 4/2010 | Powell |
| 2012/0127573 A1 | 5/2012 | Robinson et al. |
| 2012/0188791 A1 | 7/2012 | Voloschenko et al. |
| 2012/0195063 A1 | 8/2012 | Kim et al. |
| 2012/0200802 A1 | 8/2012 | Large |
| 2012/0235891 A1 | 9/2012 | Nishitani et al. |
| 2013/0127980 A1 | 5/2013 | Haddick et al. |
| 2013/0155723 A1 | 6/2013 | Coleman |
| 2013/0170028 A1 | 7/2013 | Arakawa et al. |
| 2013/0308339 A1 | 11/2013 | Woodgate et al. |
| 2014/0085570 A1 | 3/2014 | Kuwata et al. |
| 2014/0133020 A1 | 5/2014 | Woodgate et al. |
| 2015/0268399 A1* | 9/2015 | Futterer ............... G02B 6/005 315/151 |

FOREIGN PATENT DOCUMENTS

| | | |
|---|---|---|
| GB | 2428303 A | 1/2007 |
| JP | 2005134448 A | 5/2005 |
| JP | 2007199529 A | 8/2007 |
| JP | 2011191780 A | 9/2011 |
| WO | 2013033274 A1 | 3/2013 |
| WO | 2013163347 A1 | 10/2013 |

OTHER PUBLICATIONS

ISA European Patent Office, International Search Report and Written Opinion issued in Application No. PCT/US2015/031454, Sep. 14, 2015, WIPO, 9 pages.

Powell, Karlton, "Switchable Backlight Unit", U.S. Appl. No. 14/243,501, filed Apr. 2, 2014, 26 pages.

Masahiro Nishizawa, et. al., "Investigation of Novel Diffuser Films for 2D Light-Distribution Control" ITE and SID, 2011 pp. 1385-1388.

Takeshi Ishida, et. al., "A Novel Ultra Thin Backlight System without Optical Sheets Using a Newly Developed Multi-Layered Light-guide", SID, 2010, pp. 1104-1107.

Bo-Tsuen Chen, et. al., "Design of a Novel Hybrid Light Guide Plate for Viewing Angle Switchable Backlight Module", SID 2013, pp. 1181-1184.

Nicholas J. Phillips, et. al., "Links between Holography and Lithography", Proc. SPIE 2333, Fifth International Symposium on Display Holography, 206 (Feb. 17, 1995), 9 pages.

IPEA European Patent Office, Second Written Opinion issued in PCT Application No. PCT/US2015/031454, May 9, 2016, WIPO, 5 pages.

* cited by examiner

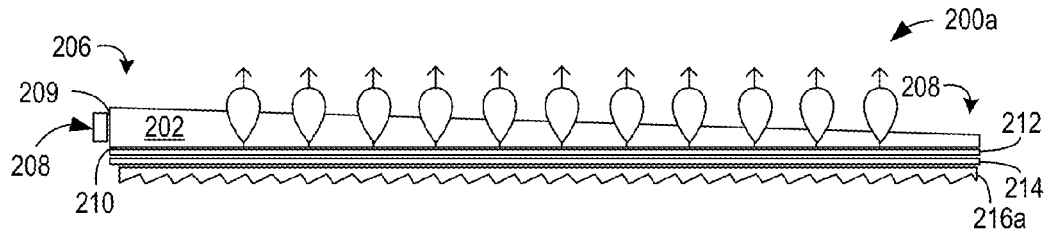
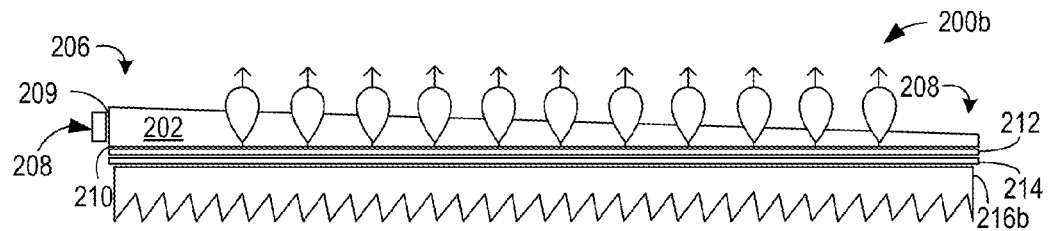
FIG. 2

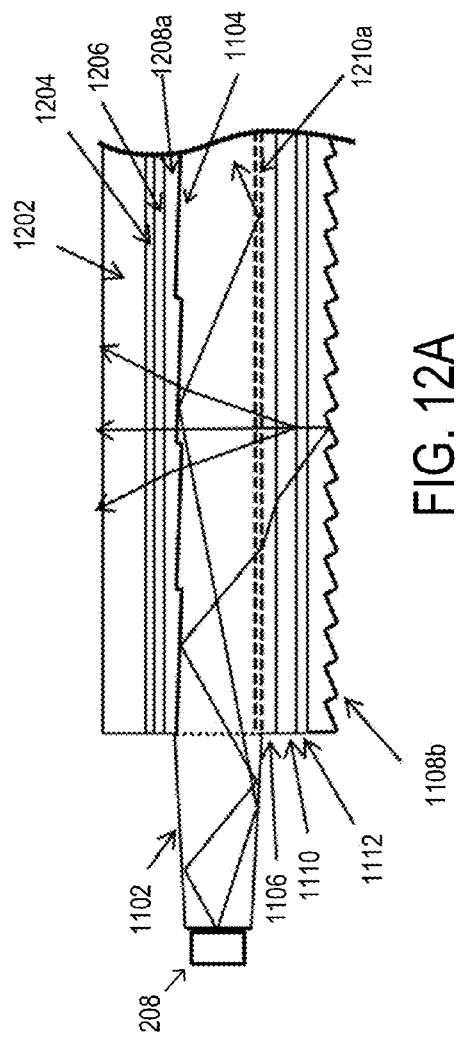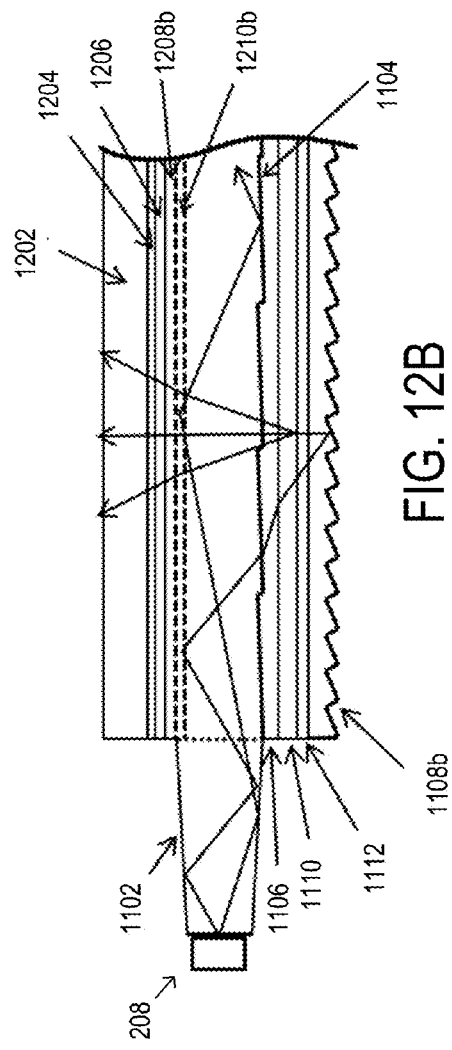

SWITCHABLE BACKLIGHT UNIT

BACKGROUND

A backlight unit may be used to illuminate display panels by directing diffuse light toward the panel at a range of angles. The angles at which light is directed to a display panel by may define a range of viewing angles from which a viewer may perceive images displayed on the display panel.

SUMMARY

Embodiments are disclosed that relate to efficient backlight units that provide uniform light intensity within a defined range of angles. In one example, a backlight unit comprises a light guide configured to receive light at a first light interface located at an end of the light guide and output light via a second light interface located at a face of the light guide, and a plurality of light sources configured to inject light into the light guide at the first light interface. The example backlight unit also comprises a graded index film configured to receive light from the second light interface of the light guide, homogenize received light that is incident on the graded index film from within a range of acceptance angles and not homogenize light incident on the graded index film from outside of the range of acceptance angles, and direct the homogenized light toward an eye box.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 schematically shows a side view of an example backlight system and modulating display panel.

FIGS. 12A and 12B illustrate example optical stacks for monolithic display configurations.

DETAILED DESCRIPTION

Figure 1A:
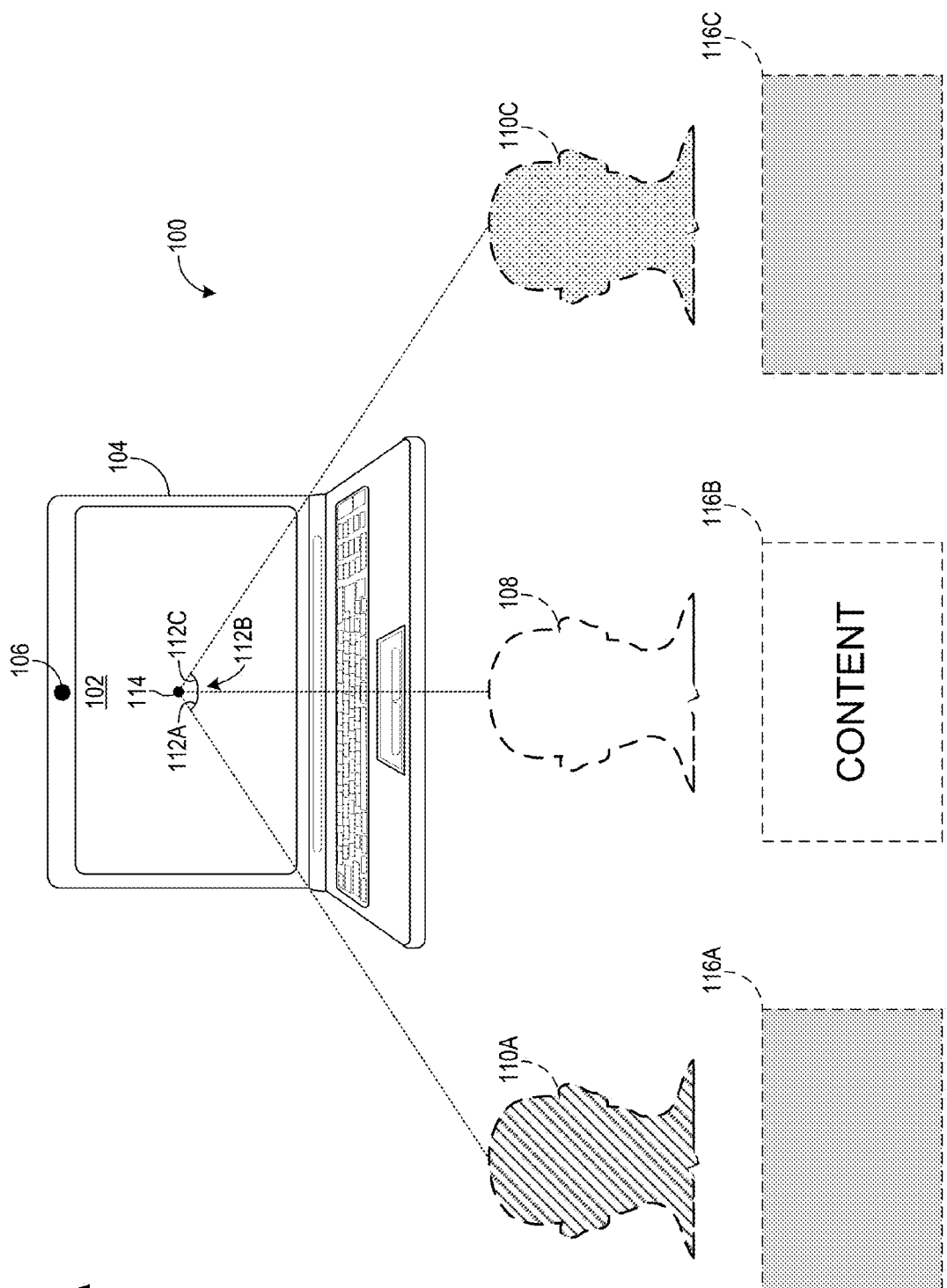
FIG. 1A schematically illustrates the display of visual content via a narrow viewing mode of an example display device.

As mentioned above, a backlight may be configured to provide illumination at various angles of incidence (AOI), low and high, to a display panel. The intensity distribution of light from a backlight unit may approach Lambertian prior to the display panel. Such a backlight may capitalize on the freedom to mix light by rescattering at any angle to achieve uniformity.

However, in implementations in which limited etendue is desired as an input to a display panel, such rescattering may no longer be advantageous, and some other mechanism may be utilized to maintain constraint on angular width while achieving an acceptable level of uniformity. Volume scattering diffusers may introduce too much scatter into higher angles due to backscatter. This may cause an increase in background levels in the form of a "shoulder" in the angular exit profile. Surface relief diffusers may help to reduce such high angle light in the exit profile, but also may result in unacceptably low uniformity within desired low view angles (relative to a normal of the display screen), as rolloff in the light intensity is mapped to a field of view (FOV) when viewing at a nominal viewing distance. A diffuser formed by laminating multiple surface relief diffusers may help in providing some level of mixing along a z-direction (normal to the image plane of the display screen), but may not create a desired flat-top intensity profile across a range of viewing angles.

A flat-top intensity profile across a viewing region, combined with a sharp transition to regions to which no light is delivered, may be difficult to achieve with traditional diffusers, as sharp rolloffs are hard to achieve at the edges of an exit angular profile using traditional diffusers. This may make it difficult to achieve both high uniformity and high efficiency at a same time for low to medium etendue backlighting scenarios. Additionally, current limited etendue backlight units may not include a diffuse functionality. Further, sharp transitions in light intensity between a viewing region and non-viewing region may be difficult to achieve via diffusion alone.

Thus, embodiments are disclosed herein that are configured to provide a relatively flat angular light intensity profile within an eye box region, as well as sharp transitions in intensity at the edges of the eye box region, via backlight units that utilize diffuse functionality and also guiding homogenization, as explained in more detail below. It will be understood that the term "eye box region" and the like signify an angular region in which an image displayed via a backlit display panel is viewable. While an eye box may be considered as a volume of space within which the display panel is viewable, the angular extent defining the limits of the eye box may be considered to be defined by the extent of the angular region.

In some cases, a user of a display device may wish to limit the angular range of an eye box in order to provide a private, or narrow angle, viewing mode. In other cases, a larger eye box may be appropriate to provide a public or wide viewing mode, such as during a group viewing activity, in which multiple viewers are positioned around the display panel at a wider range of angles relative to the display panel. Accordingly, embodiments are also disclosed herein that relate to providing multiple viewing modes with different eye boxes via a switchable backlight unit. A non-limiting example of a narrow view angle or mode is a +/−30° angular region.

FIG. 1A schematically depicts an example viewing environment 100, and illustrates the display of content in a narrow angle view mode via an example display 102. As depicted, display 102 is incorporated within a laptop computer. In other embodiments, the display may be housed in other types of devices enclosures (e.g., desktop computing device, smartphone, tablet, etc.), or housed separately from a computing device providing the image data, as potentially in the case of a television or computer monitor.

Display 102 may be operated in what is referred to herein as a private viewing mode in which displayed content is easily viewable by user 108 but not discernable by persons 110A and 110C. In the depicted example, the visual content output by display 102 comprises an image represented by the generic term CONTENT which is fully legible and perceptible by user 108 from viewing angle 112B, whose perception of the visual content is schematically represented by window 116B. Conversely, persons 110A and 110B perceive visual content which is approximately uniform, grey, and appears to lack any perceptible text. The perception of visual content by persons 110A and 110C is schematically illustrated by respective windows 116A and 116C. In this example, user 108 may be viewing the display 102 from an angle 112B that is within a narrow mode eye box, while the viewing angles 112A and 112C, from which persons 110A and 110C, respectively, are viewing the display 102, may be outside of the narrow mode eye box.

Figure 1B:
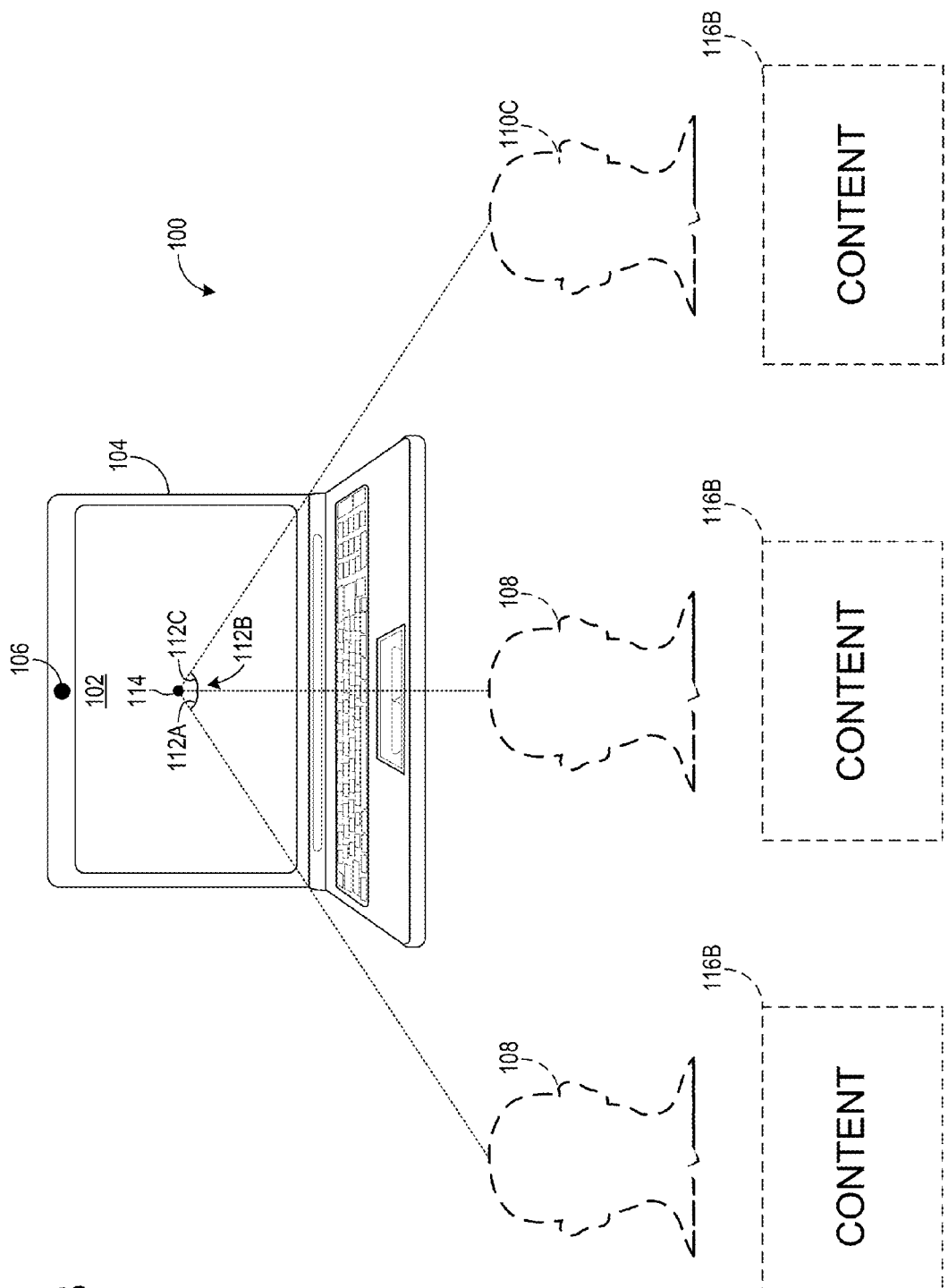
FIG. 1B schematically illustrates the display of visual content via a wide viewing mode of the example display device of FIG. 1A.

Turning now to FIG. 1B, display 102 and/or an associated backlight unit for display 102 may be switched to a public or wide viewing mode. In the example illustrated in FIG. 1B, visual content (e.g., images, video, etc.) presented by display 102 may be publically viewed. In the depicted example, the visual content output by display 102 (again represented by the generic term CONTENT) may be fully legible and perceptible by user 108 as well as persons 110A and 110C. The perception of the visual content by user 108 and persons 110A and 110C is schematically illustrated by windows 116B, indicating that the same visual content is viewable by each of user 108 and persons 110A and 110C. In this example, each of the angles 112A-112C, from which the user 108 and persons 110A and 110C are viewing the display 102, may be included in a wide mode eye box.

FIG. 2 shows a side view of example backlight systems 200a and 200b that may be used to illuminate a display panel 201. Backlight systems 200 and 200b each may be suitable for use as display 102 in FIGS. 1A and 1B in some examples. Backlight system 200a comprises a wedge-shaped light guide 202 having a thin end 204 and a thick end 206. Thick end 206 includes a light input interface 209 configured to receive light injected by a plurality of light sources 208, which may include light-emitting diodes or other suitable light sources. Although illustrated as a wedge-shaped light guide, it is to be understood that light guide 202 may be formed in any suitable configuration. For example, the light guide may comprise a Fresnelated plate in some applications, such as a light guide plate (LGP) having prismlet or wedgelet extraction features in order to extract uniform intensity versus position across the light guide. In some embodiments, such features may be sparsely placed. Further, the light input interface also may be located at a thin end of the wedge-shaped light guide 202 in some implementations. Light guide 202 may be configured to change the angle of internally reflected light from light sources 208 and to output the light. Such films are described in more detail below. a light exit interface at a bottom face 210 (e.g., the face that is directly above and extends in parallel to a low index isolation layer 212) of the light guide, such that the light exits the light exit interface at or above a critical angle of internal reflection. It will be understood that various dimensions of the light guide 202 and the depicted light path may be exaggerated for the purpose of illustration.

Light from light sources 208 may pass through a low index isolation layer 212 and an angle-dependent diffuser layer 214, discussed in more detail below, and arrive at a redirective element 216a. The redirective element 216a may include a reflective coating and surface profile that together are configured to redirect light toward the diffuser layer 214, e.g. by reflection, such that light passes back through the diffuser layer 214. As described in more detail below with respect to FIG. 6, the angle-dependent diffuser layer 214 may comprise one or more graded index diffusing film layers, each of which is configured to diffuse and homogenize light received at the diffusing layer that is within a solid angle of acceptance of the layer. Light that arrives at a given diffusing layer from an angle outside of the solid angle of acceptance may be transmitted through the layer with substantially no diffusion and homogenization. Graded index films are described in more detail below.

Low index isolation layer 212 may be selected to achieve a desired critical angle of internal reflection, and thereby to set an angle at which light exits the light guide 202. For example, the low index isolation layer 212 may take the form of a cladding layer formed on the bottom face 210 of the light guide. Accordingly, light exiting light guide 202 via face 210 may pass through the angle-dependent diffuser layer at an angle outside of the solid angle of acceptance of the angle-dependent diffuser layer, be redirected by the redirective element, and pass back through the angle-dependent diffuser layer such that the light is diffused and homogenized by the angle-dependent diffuser layer. Light exiting the angle-dependent diffuser layer may form an eye box comprising a region having a relatively flat intensity distribution and sharp intensity transitions at the edges due to the homogenization from the angle-dependent diffuser layer.

The location and size of the eye box may be a function of a configuration of the index grating(s) in the angle-dependent diffuser layer, as described in more detail below with respect to FIG. 6. Thus, different graded index layers, or even potentially different index gratings in a single layer, with the index gratings arranged along different directions may be used in combination with suitable light source configurations to form eye boxes at different angular locations. As one example, described in more detail below, different graded index layers may be used to form narrow angle mode and wide angle mode eye boxes. Further, the average grating vector of the index gratings may be tilted versus position across the angle-dependent diffuser layer in order to comprise a position-dependent pointing angle-dependent diffuser and achieve overlap of each respective mode eye box in order to form eye box overlap at a given distance from the display. In such an example, the redirective elements 216a and 216b, shown in FIG. 2, may include change in tilt angle bias of the facets versus position along the length of propagation in the light guide plate (LGP), in order to bias and redirect light within the acceptance of the position-dependent pointing angle-dependent diffuser for all positions along the propagation length of the LGP, and in order to form substantial overlap of extracted light at a given z distance from LGP in a first plane containing the surface normal of the LGP exit face and orthogonal to the direction of light propagation through the LGP. Further, overlap of extracted light may be formed in a plane that is both orthogonal to this first plane and containing the surface normal of the LGP exit face, in order to provide substantial overlap of the viewing eye boxes in two dimensions, at a given z distance. Such effect may be achieved by curving the facets of the redirective elements 216a and 216b in a radial fashion, as by facets having radial trajectory along the facets. By making use of concave facet radii with respect to the light injection end of LGP, the extracted light output at a given exit angle across the LGP may be made to converge at a given z distance from LGP, and further homogenously diffused by the angular sensitive diffuser.

Backlight system 200b is similar to backlight system 200a, with the exception of redirective element 216b. While redirective element 216a may be coated with a reflective coating, redirective element 216b may comprise a multi-refractive and/or total internal reflection turning layer, as opposed to a reflective coating. In this way, redirective element 216b may redirect light without the use of a reflective coating. Due to scatter, a small portion of light energy may transmit through the redirective element 216b, or turning layer, and as such a reflector, while not required, may be added to reflect that light back into the viewing eye-box regions, and such reflective layer may be specularly reflective or diffusely reflective.

It is to be understood that there may be other example configurations of the optical stacks illustrated in FIG. 2 which achieve a substantially similar functionality. For example, the low index isolation layer may comprise a UV-curable resin having low refractive index, or may be formed by laminating a thin, clear, low index film such as FEP film, which is a type of fluoropolymer film bonded by optically clear adhesive, such as optically clear PSA, to both the LGP on one side and the turning film on opposing side. The LGP may be (1) a wedge tapering substantially close to zero thickness at the end with light coupled into the thick end such as for a single-pass LGP scenario, or may be (2) a wedge having non-zero thickness on either end, such that light is coupled into the thin end, and a fresnelated biprismatic end reflector is used to enable the wedge to serve as a double pass LGP, enabling lateral mixing along wedge length to improve homogenization of extracted output light, and (3) a substantially flat LGP having sparsely spaced prismlet extraction features having constant or varied density along the length of LGP, which may be a film-based backlight such that the features are replicated on the film substrate surface using UV-cure resin to replicate from a mold master. Further, the LGP may include corrugations running along the length of propagation, on the side opposing the extraction features, such that the cross-section of the corrugations may comprise either a prismatic array having substantially near 90° included angle, or other profiles such as lenticular-like or sine wave like corrugations, for the purpose of improving homogenization of light prior to being extracted from the LGP. The LGP having such corrugations may be oriented with the corrugations facing the low index isolation layer or opposing.

For the example of using near 90° included angle prismatic array facing the low index isolation layer, the angles of incidence (AOI) provided by the prismatic surface may enable more freedom in choice of index of isolation layer due to the apparent reduction in critical angle induced by the surface tilt and skew ray angles incident at that surface, such that a higher refractive index may be utilized as an isolation layer that would not have served that function for a flat interface layer. The prismatic may additionally be utilized to partially homogenize the light, as the light is partially guided within a single period or corrugation of the prism facets, prior to extraction.

In some examples, it may be desirable to utilize input light having angular content which is concentrated not only in the lateral angular zones, but also in the orthogonal dimension corresponding to the range of angles which may correlate approximately to extraction position along the length of the propagation dimension of the LGP. For this scenario, a concentrator profile may be further applied in the orthogonal cross-section near the coupling end of LGP, such a reverse taper which couples light in and concentrates high angle light into a range of angles which correspond to angles which may be extracted from the LGP at a location within the active region of the LGP, thus improving efficiency in such scenario. Further, the concentration in this orthogonal dimension may be provided by a curvature added to the input end of guide, such as a parabolic concentrator profile across the thickness dimension of the input face. Regarding options to provide a backlight having improved mechanical robustness, there are various configurations to form a monolithic backlight. As one example, a low refractive index bond layer, having refractive index lower than that of the isolation layer adjacent to redirective element, may be added to the top of the optical stacks in FIG. 2 in order to enable the monolithic backlight to be bonded directly to the backside of an LCD display panel, which may include a film for polarization recycling, such as 3M DBEF or APF (available from 3M, St. Paul, Minn.), or may further be wire grid polarizing film (WGF) film, such as WGF film (available from Asahi Kasei E-materials Corp., Tokyo, Japan), bonded to backside of LCD panel. It is to be understood that some portion of the tips of the facets of the turning film, such as the pseudo-collimating turning film which multiply refracts and TIR reflects light to turn light into viewing zones, may not be illuminated with light. Accordingly, these tips may be slightly flattened or left sharp, and adhered directly to a PSA layer which is thin enough to leave the air gaps between facets, such that the tips of the facets may be bonded with a structural layer below, which may be specularly or diffusely reflective. Such a structural layer may comprise carbon composite sheet or other thin yet rigid material so as to increase stiffness of the optical stack. By taking advantage of the fact that the optical stack may be monolithic, such further thinness as well as structural stiffness may be provided by the backlight, enabling thinner LCD panels or panels having less robust polymer top layers.

Figure 11A:
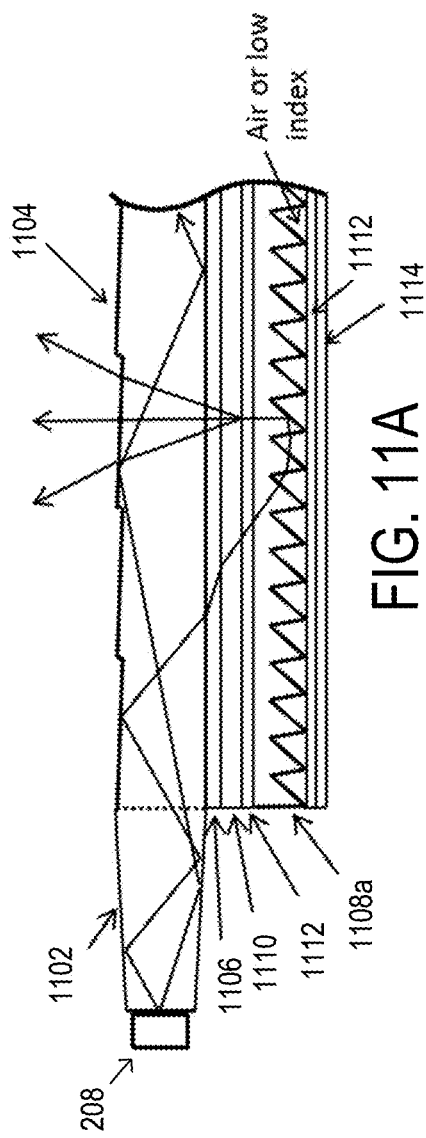
FIGS. 11A and 11B illustrate example optical stacks for monolithic backlight unit configurations.
Figure 11B:
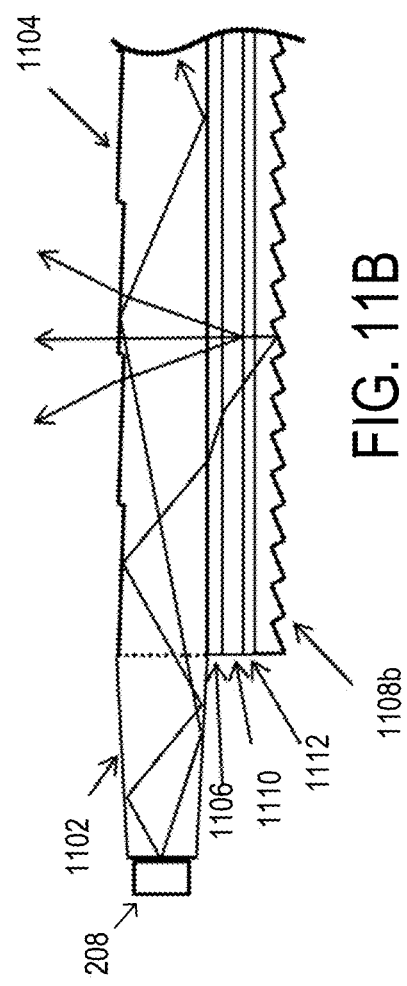

An example of such an optical stack is illustrated in FIG. 11A. An optional reverse-taper collector (in the illustrated dimension) and concentrator (in the orthogonal dimension) 1102 may be utilized to collect and/or concentrate light from light source 208. Low-profile extraction features 1104 may leak light evenly beyond TIR into a low refractive index layer 1106, thereby allowing light to encounter the multiple-refract TIR-reflect redirective element 1108a and be extracted after transmitting through angular selective diffuser 1110. Bond layers 1112 are described in more detail above and may allow an optional reflective and/or structural stiffener layer 1114 to be bonded below redirective element 1108a. FIG. 11B illustrates a similar optical stack that utilizes a reflective-coated redirective element 1108b.

FIGS. 12A and 12B show example optical stacks for monolithic displays, and similar elements to those described above with respect to FIGS. 11A and 11B utilize the same reference numerals as presented above. As illustrated in FIGS. 12A and 12B, an LCD panel 1202 may be arranged above an optical bond layer 1204, which is arranged above a polarizing film 1206. In the example illustrated in FIG. 12A, a layer 1208*a* has a lower index than low refractive index layer 1106. Low-profile "leaky" extraction features 1104 may be arranged under layer 1208*a*, and an optional flat surface or 90 degree prismatic array surface 1210*a* may be arranged on a bottom side of the LGP, with facet grooves that are aligned along propagation length/direction. In the example illustrated in FIG. 12B, layer 1208*b* has an index or apparent index due to the use of a prismatic array surface on LGP that is lower than the low refractive index layer 1106. Optional flat surface or 90 degree prismatic surface 1210*b* is arranged on a top side of the LGP, with facet grooves that are aligned along propagation length/direction. Below surface 1210*b* is the low-profile "leaky" extraction features 1104.

Figure 13:
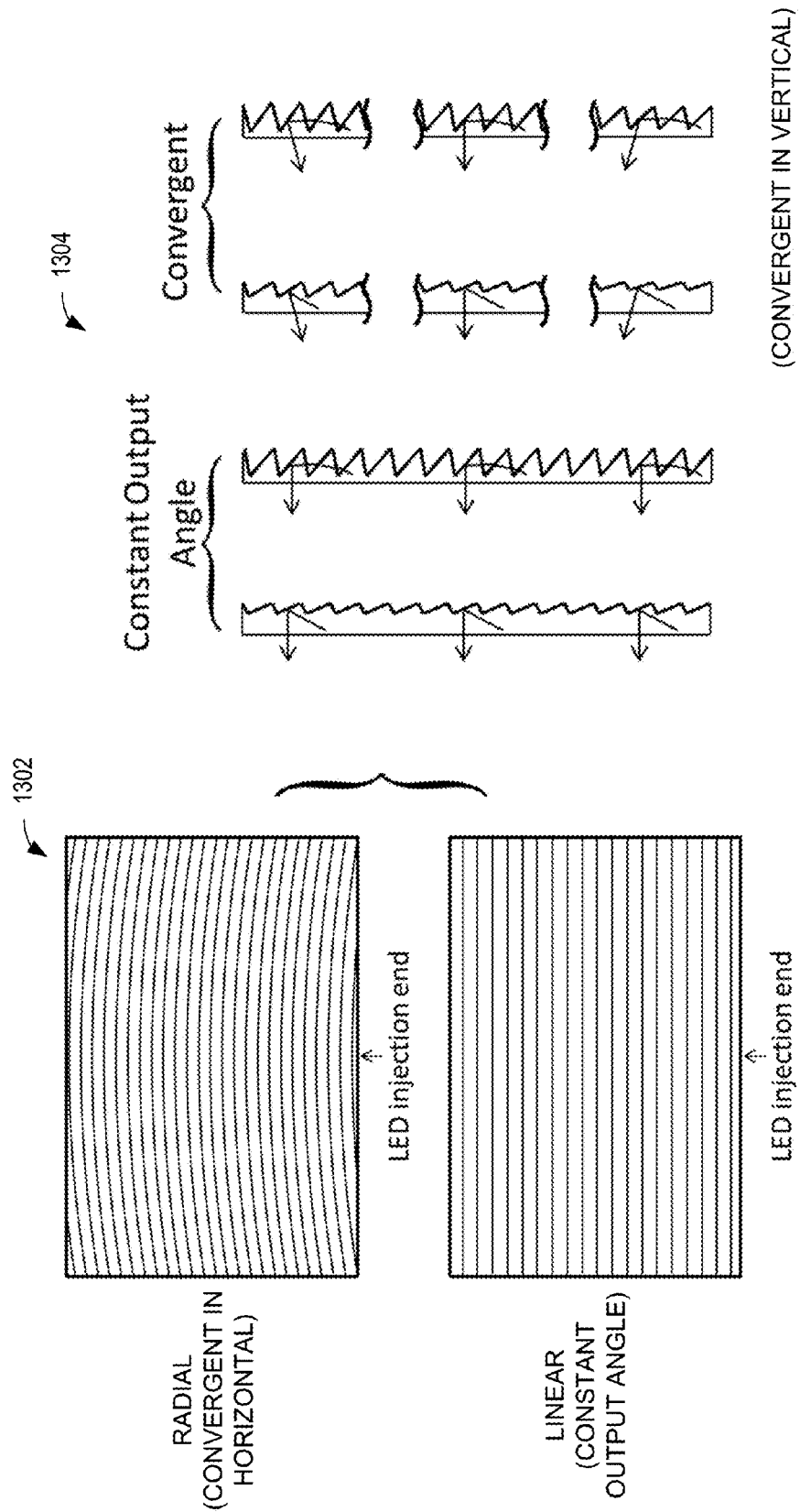
FIG. 13 illustrates example redirective element layers for a redirective element of an example backlight system.

FIG. 13 illustrates different views of example redirective element layers. For example, at 1302, a redirective element layer is illustrated having facets with radial arcs in the plan view of the LGP for convergence in the plane containing LGP surface normal and orthogonal to the propagation direction (horizontal). At 1304, the redirective element layer is illustrated having angular bias versus position along the propagation direction, shown in side view, in order to form convergence in the plane containing LGP surface normal and the propagation direction (vertical).

Note that for the case of using reflective coated redirective element 216*a*, light reflects off the prismatic facets, and thus does not transmit through the layer, such that the bottom surface may be bonded directly to another media layer to improve stiffness of the optical stack. In this case, the profile of the prismatic array of redirective element 216*a*, along the propagation dimension, may be angularly biased, as like a saw tooth profile as shown in FIG. 2, or have facet symmetry as like a triangular profile, so as to enable light to be injected from both ends of, or in both directions within, the LGP such that light extracted from guide into low index isolation layer, below LGP, from one direction interstitially illuminates and is turned by reflective facets facing one direction of tilt, and light extracted from guide into low index isolation layer from opposing direction illuminates and is turned by facets facing the opposing direction of tilt, such that light may either be injected into one or both ends of the light guide, or light reflecting off an end reflector at one end of the light guide, may be extracted and turned toward one or more of the viewing zones. For the latter case of reflective coated redirective element 216*a* having symmetric turning facet profile, the sparsely spaced extraction prismlet features on at least one of the surfaces of the LGP may exhibit symmetric profile, as an alternative to a saw tooth bias, in order to accommodate light extraction bidirectionality and further enable symmetry of the angular exit profile into viewing zones.

Regarding polarization recycling, a polarization splitting layer, such as DBEF, APF or WGF, may be placed or laminated between the LCD panel and the monolithic backlight stack in order to recycle light having polarization state orthogonal to the input polarizer of LCD display panel, or in some cases, may be bonded between the LGP and the low index isolation layer, such that extracted light may be substantially polarized upon being extracted. Additionally, it will be noted that the angular selective diffuser layer may be laminated between the low refractive index isolation layer below LGP, and redirective element layer in some examples, such that the light passes through the layer at least twice. In additional or alternative examples, such as the scenario of bonding to display panel by using a low refractive index optical bond layer, having refractive index lower than that of the low refractive index layer between LGP and redirective element, between the display and LGP, the angular selective diffuser layer may be laminated between the display panel, with or without polarizing film for polarization recycling, and the upper low index layer. For these examples, light transmits through the angular selective diffuser layer substantially a single time, unless polarizing film is utilized on the bottom of display panel, in which case recycled light may transmit through diffuser layer more than once.

It is to be understood that other diffusers, such as a volume diffuser, surface relief diffuser, and/or laminated surface-relief diffuser may be combined with an angular selective diffuser to form a convolved output for such case as the fixed output (non-switchable case) monolithic BLU or monolithic display described above. By using an angular selective diffuser to provide the uniform central eye box zone, and placing one of these other diffusers above the LGP, between the LGP and the display panel, the backlight may provide an exit output comprising the convolution of the angular selective diffuser and the secondary diffuser, such that a fixed, non-switchable, output backlight may provide a uniform plateau or nearly uniform flat-top angular region for low-to-medium viewing near the central angular zone, yet provide diffused light for higher view angles outside the central viewing zone, such that the angular selective diffuser layers intended to form the two lateral zones are not required, allowing a rolloff in luminance from the edge of central viewing zone toward higher view angles. By making use of a diffuser having an elliptical angular shaped exit cone, one of the view angles, such as horizontal versus vertical, may be preferentially increased, forming an efficient output, having both high uniformity within a limited central viewing zone, as well as visibility of display at higher angles outside the zone, but with a rolloff, providing comfortable viewing transition from central to outer zones.

While these diffusers do exhibit an increase in diffuser strength, due to $1/\cosine(\theta)$ increase versus angle for surface relief diffusers (where $\theta$ is the angle of incidence), and due to increased optical path versus higher angles for volume scattering diffusers, the response may be monotonically smooth, compared to/in contrast with the case of an angular selective diffuser, which exhibits more sharp transition between diffuse homogenization and non-diffuse transmission versus angle.

Figure 3:
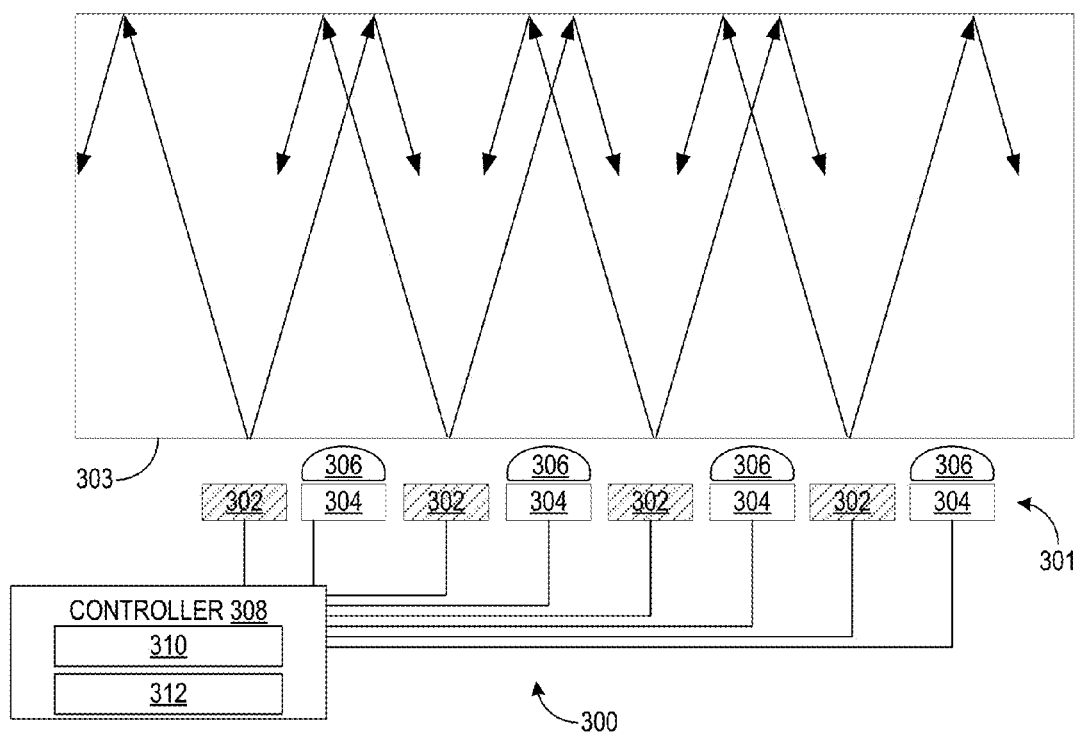
FIGS. 3 and 4 schematically show an example backlight system configured to output light in wide and narrow viewing modes.
Figure 4:
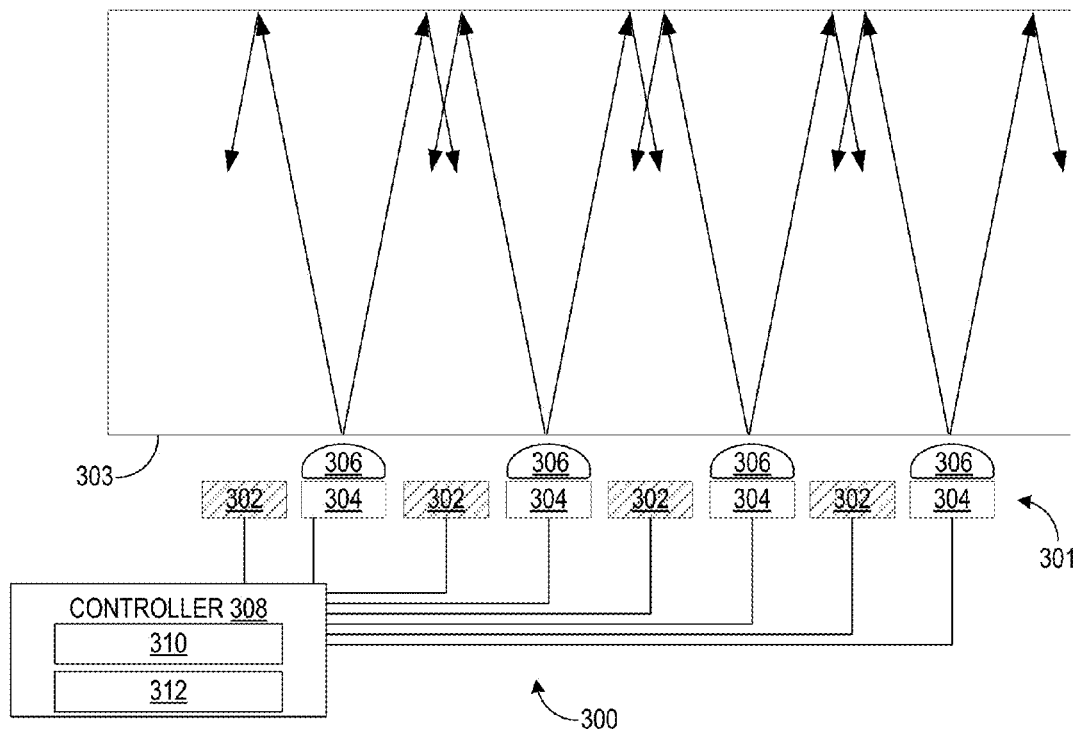

FIGS. 3 and 4 schematically show top views of one example of a suitable backlight system 300 for enabling narrow and wide display modes in combination with suitably arranged graded index films, discussed below with reference to FIG. 6. Backlight system 300 includes a plurality of light sources 301 having a first subset of light sources 302 (shaded in the figure) configured to inject light having a relatively wide angular intensity profile into an optical wedge 303, and a second subset of light sources 304 configured to inject light having a relatively narrow angular intensity profile. Each light source in the second subset of light sources 304 includes a concentrator 306 configured to concentrate light from its adjacent light source to which it is optically coupled. The first subset of light sources 302 may be illuminated to provide for a non-private mode, emitting light within the solid angle of acceptance of both wide and narrow mode angle-dependent diffuser layers, and the second set of light sources 304 may be illuminated to provide for a private mode, emitting light within the solid angle of acceptance of the narrow mode but not the wide mode angle dependent diffuser layers. It will be understood that the light sources may be arranged either at a thin end or at a thick end of an optical wedge, depending upon the configuration of the wedge.

As shown in FIGS. 3 and 4, the plurality of light sources 301 are operatively coupled to a controller 308 comprising a logic subsystem 310 and a storage subsystem 312. Storage subsystem 312 may include instructions executable by logic subsystem 310 to control light sources 301 and drive selection of the wide and narrow viewing modes. Logic and storage subsystems 310 and 312 may be included in computing device 104 in FIG. 1, for example. Examples of suitable logic and storage subsystems are described below with reference to FIG. 8. While the embodiment of FIGS. 3 and 4 comprises two different subsets of light sources, other embodiments may utilize three or more, depending upon a number of individually controllable viewing angle ranges that are desired.

Figure 5A:
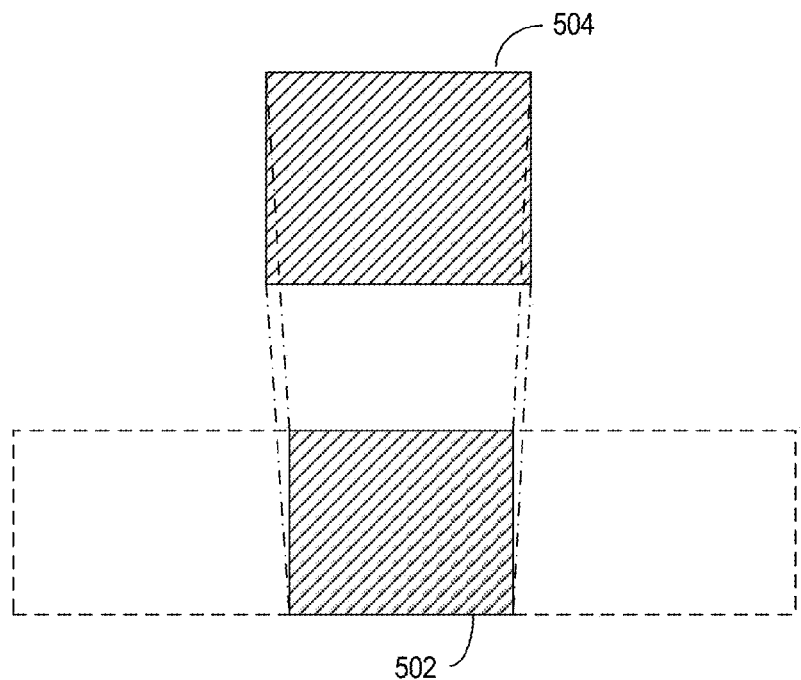
FIGS. 5A-5C show example eye boxes for a narrow mode and two example wide modes.
Figure 5B:
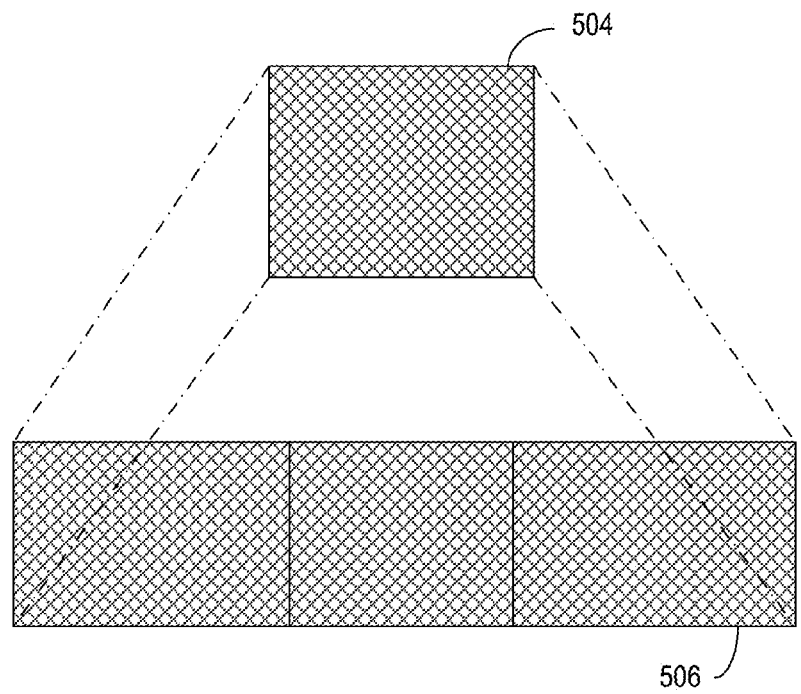

FIGS. 5A and 5B show example eye boxes achieved using different angles of light input into a light guide of a backlight unit. First, FIG. 5A shows an example narrow mode eye box 502. For example, a user located in front of the display device 504 in a region within the narrow mode eye box 502 may be able to view the content of the display device 504, while a user located outside of the narrow mode eye box 502 may not be able to view the content of the display device 504 during a narrow mode. While optical scatter may allow some light to scatter into neighboring eye boxes, sharp transitions between angular regions may enable a substantial difference in viewability and relative luminance between these angular regions.

FIG. 5B shows an example wide mode eye box 506 formed, for example, via illumination of the wide angle light sources of FIG. 3. The wide mode eye box 506 may be formed via a first graded index film having a first range of acceptance angles and diffused a second graded index film having a second range of acceptance angles to either side of the first range, as described in more detail below.

Figure 5C:
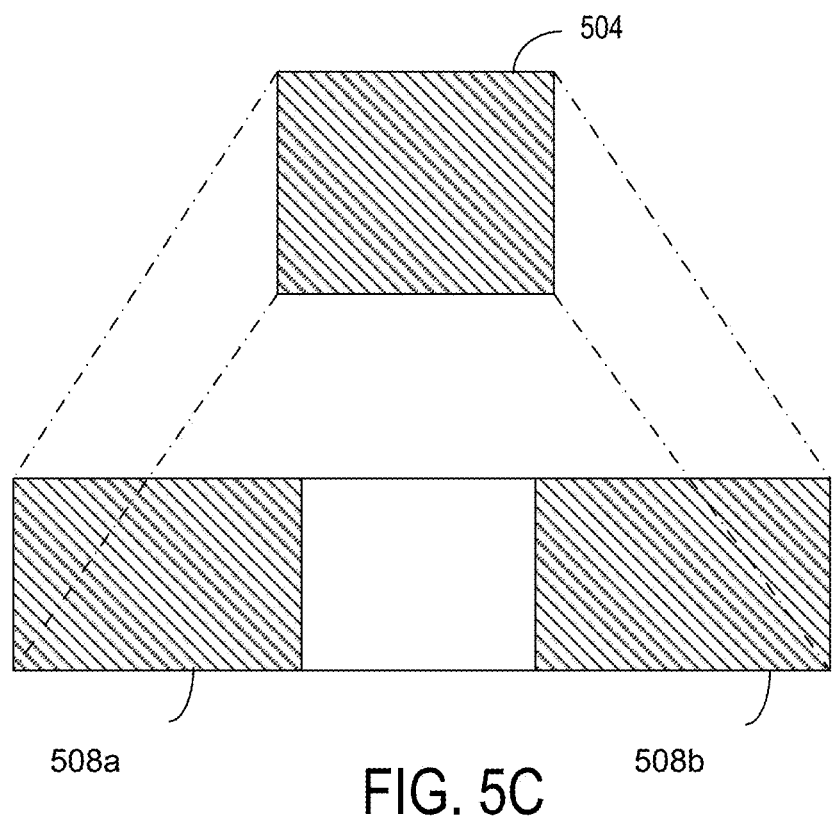

FIG. 5C shows another example wide mode eye box 508. As illustrated, the wide mode eye box 508 includes adjacent regions on either side of the narrow mode eye box 502, and omits the region of the first eye box. Such an eye box may be formed, for example, via use of a collimating optical wedge, in combination with illuminating a subset of light sources located at a left and right side of the light input interface of the wedge (e.g. an end of the wedge, as shown in FIG. 3), and not light sources in the middle, and also in combination with appropriately oriented graded index films.

It is to be understood that various combinations of narrow and wide modes may be used to achieve the total wide mode. For instance, a wide mode eye box may be formed by illuminating light guide with wide mode light sources alone, or in combination with narrow mode light sources. For the latter case of total wide mode being a sum of narrow plus wide sources, an additional option includes using an additional optic to redirect light from wide light source(s) that are normally configured to illuminate the central eye box into the lateral wide eye boxes. Thus, at least three combinations for creating the complete wide mode include: (1) wide angle light from light source(s) without any redirecting optic, such that light emitted into the lateral high-angles fill the left and right eye boxes and light emitted into low angular region fill the central eye box, (2) wide light sources plus narrow light sources that are illuminated at substantially the same time, and (3) wide mode light sources having additional redirecting element which constrains light emitted from the wide mode light sources into either left or right angular regions of acceptance plus narrow mode light sources. For example, mode (3) may be achieved by an air prism shape positioned in the light guide just after the wide light source input, the air prism shape being configured to split/redirect low angle light into only the higher angular regions. It is to be understood that a fixed wide plus narrow backlight, which is not switchable, may be formed by injecting light from an array of LEDs into a straight light guide panel (LGP) input face, thus without light concentration, or with limited concentration as by concentrators which allow both low and high angle light, such as the concentrator in FIG. 9D with or without the central divet, for example. Such a fixed wide plus narrow backlight may be utilized in order to reduce high angle extent but inject both low and high angle light into the wide and narrow viewing zones. Further, a fixed narrow-only backlight, which is also not switchable, may be formed by injecting light from an array of LEDs into a corresponding array of narrow-only concentrators, such as the concentrators in FIGS. 9A & 9B.

Figure 9A:
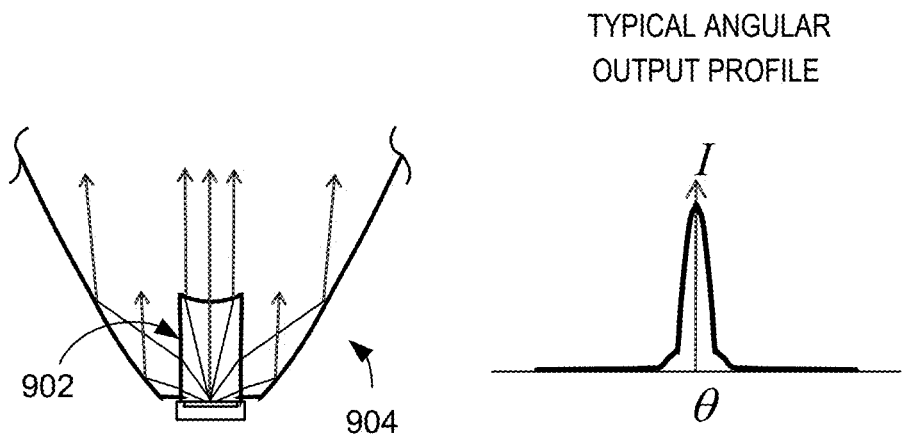
FIGS. 9A-9G show example configurations of concentrators for creating wide and narrow mode eye boxes.
Figure 9B:
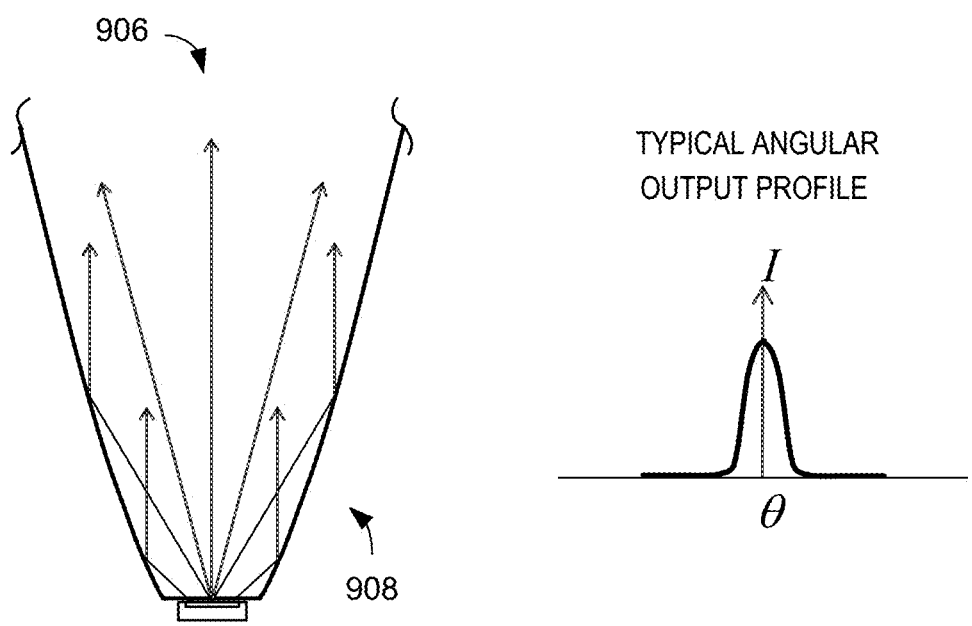

FIGS. 9A-9G show example configurations of concentrators for the different combinations for creating wide and narrow mode eye boxes. FIGS. 9A and 9B illustrate example narrow mode concentrator options and respective angular output profiles for concentrators that may be utilized in narrow mode. The example shown in FIG. 9A comprises a Fresnelated or Hybrid concentrator having a one dimensional profile and comprising a refractive central pseudo-collimating zone 902, using an air gap having top and bottom reflective layers, and at least one or more refractive plus total internal reflection (TIR) reflective outer zones 904. FIG. 9B shows a parabolic type concentrator having a one dimensional profile and comprising a refractive central pseudo-collimating zone 906, using an air gap having top and bottom reflective layers, and at least one or more refractive plus TIR-reflective outer zones 908.

Figure 9C:
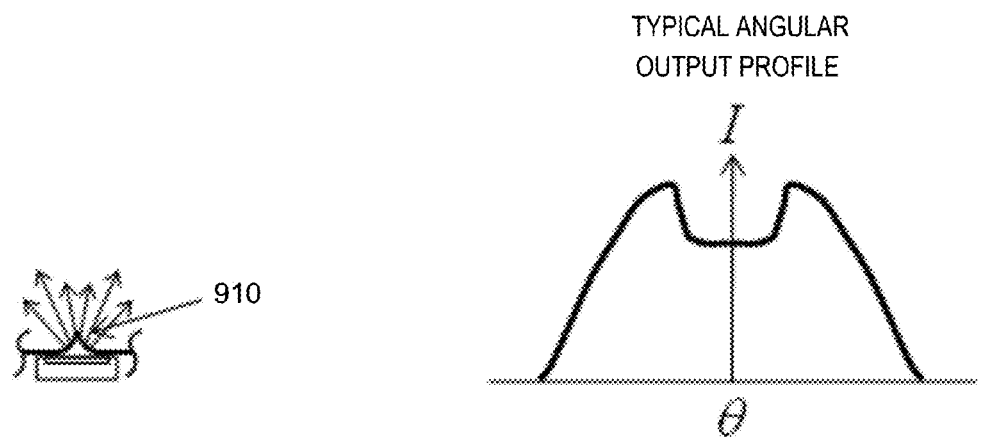
Figure 9D:
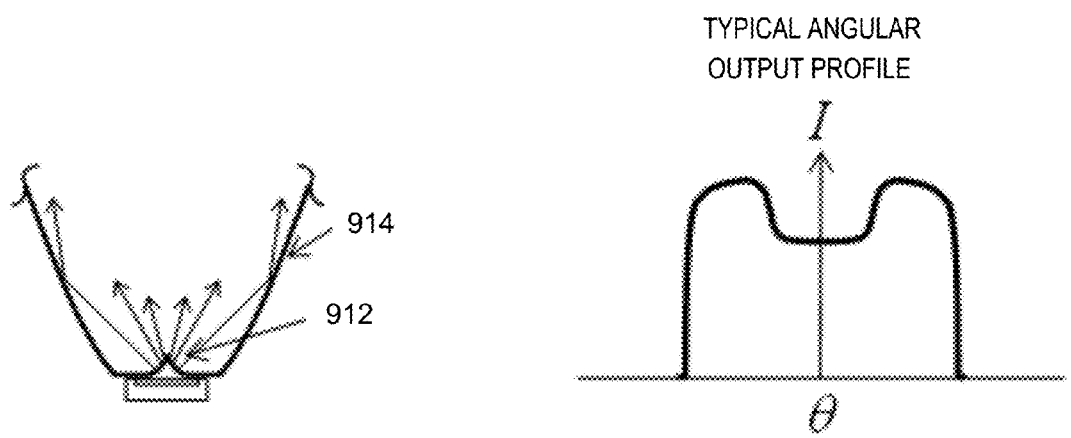

FIGS. 9C and 9D illustrate example concentrator options and respective example angular output profiles for a mode in which wide and narrow mode light sources are illuminated together. One or more of the concentrators illustrated therein may be added interstitially between one or more of the narrow mode concentrators (e.g., the narrow mode concentrators described above with respect to FIGS. 9A and 9B). A luminance profile (e.g., 1:1, 2:1, etc.) may be based on a number of wide-add mode concentrators positioned between the narrow mode concentrators. FIG. 9C shows a profiled divot 910 having a one dimensional cusp profile and an air gap with reflective layers on top and bottom to guide light in the air gap region. A central peak energy may be redistributed into higher angles, enabling the 'bat-wing' angular exit profile illustrated in FIG. 9C. This angular exit profile may have reduced energy within low angles compared to Lambertian light. FIG. 9D shows a profiled divot 912 with a TIR reflective wall creating a TIR outer zone 914. By adding the TIR reflective wall, the higher exit angles may be limited, so as to enable wide mode light to efficiently fill the wide zones, while at the same time redistributing a portion of low angle light energy into higher exit angles.

Figure 9E:
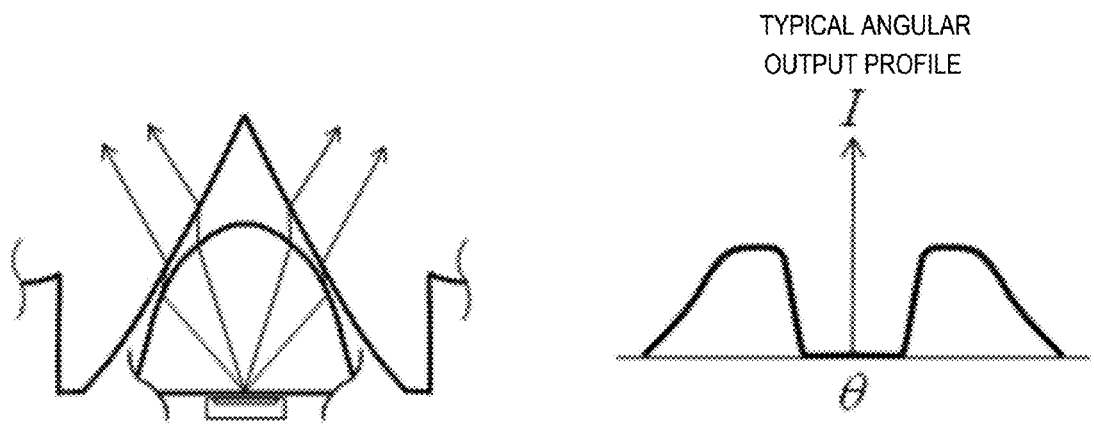
Figure 9F:
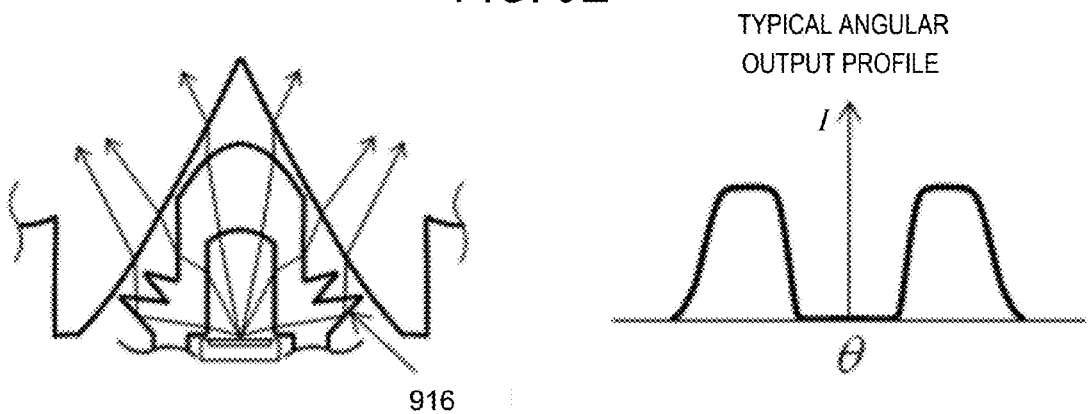
Figure 9G:
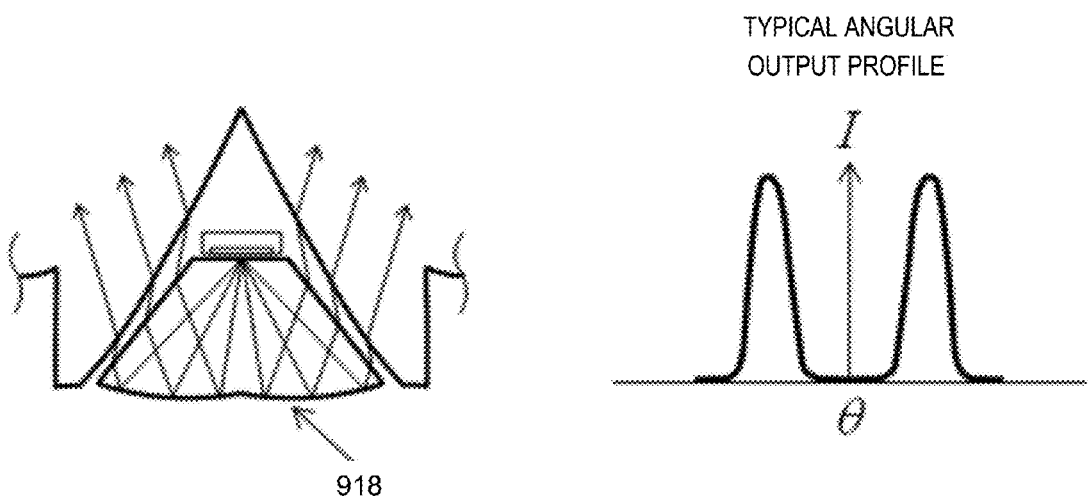

FIGS. 9E-9G illustrate example wide-only mode concentrator options and respective typical angular output profiles. The concentrators illustrated therein may be added interstitially among one or more of the narrow mode concentrators (e.g., the narrow mode concentrators described above with respect to FIGS. 9A and 9B), utilizing the narrow concentrator side reflector walls. It is to be understood that the reflective sidewalls of concentrator in FIG. 9B may comprise a nonlinear profile, such as a parabolic profile, or a linear expanding taper, in order to provide acceptable concentration of light as input to the narrow viewing zone. FIG. 9E shows a lens construction having a conic and radius or a combination of multiple offset conic profiles in order to pseudo-collimate the light sources' near-Lambertian output.

Accordingly, light exiting the lens may refract at high AOI into a side of a narrow mode concentrator, forming substantially high angle output. FIG. 9F shows a lens construction including TIR lens facets 916. By further isolating and guiding high angle light within an air gap region into refraction side wall then toward TIR-based Fresnelated facets, additional control of high angle light may be achieved relative to lens-only constructions. FIG. 9G shows a double-pass reflective prism extraction construction. By facing the light source opposing the guide input, a prism may be used to allow light to expand, reflect from a reflective coated end profile walls 918 having laterally offset curvatures and fold symmetry, and be extracted at high AOI toward the side of a narrow concentrator as an input face. Accordingly, fairly constrained output may be achieved, as illustrated in the respective typical angular output profile.

It is to be understood that any of the concentrators may include a reverse taper, or expanding wedge, along propagation direction, but expanding in the light guide thickness dimension along the length of the concentrator, in order to concentrate, or redistribute, high angle light relative to the plane at the center of thickness of LGP, or in other words light angles corresponding to extraction regions near the light input end of the LGP. In this way, the light may be extracted uniformly within a portion of the length along LGP by design, using both concentration of high angle light as well as density of extraction features vs position along LGP, to provide both uniformity across LGP as well as efficiency. An additional alternative for the narrow input coupler may include a single LED injected into the end of a long, thin guide which comprises a one-dimensional cross-section of the optical stacks illustrated in FIG. 2, with or without a diffuser layer, which provides output to the main LGP, such guide having thickness matching that of the main LGP and light being extracted out the long side facing input face of LGP, such that the angular character of the light is narrow in the plane substantially parallel to the exit face of the LGP, has low angles of incidence relative to the LGP input face, and is wide in angular spread within a plane that is orthogonal to the LGP exit face and containing the surface normal of the LGP input face.

Figure 10:
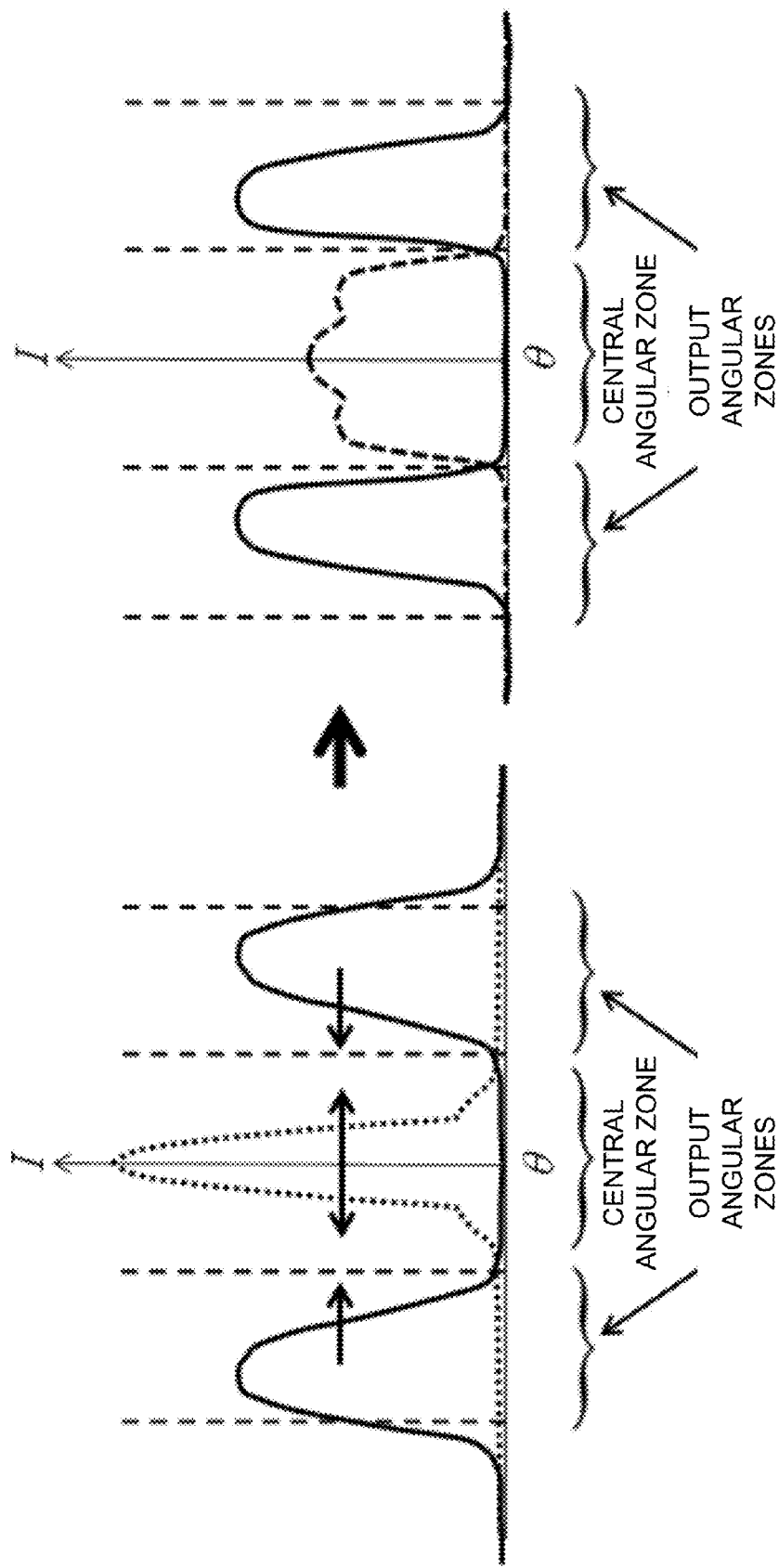
FIG. 10 illustrates example angular output profiles for narrow and wide viewing modes.

FIG. 10 illustrates example angular output profiles, not including the homogenization functions of the angular sensitive diffuser layer or layers, for narrow and wide light in order to show the trade-off between the sharpness of input narrow light and lowest angle of high-angle input wide light. By compromising the angular width of the narrow concentrator output, by allowing broadening due to reduction of tilt angle of side reflector walls with respect to source output plane, the critical angle requirement of the wide input light may be shifted in angle so as to allow higher AOI at the input to narrow concentrator sidewall reflectors, thus enabling lower exit angles of the wide mode light, which may be beneficial in cases where the angle-sensitive diffuser has limited angular width to form an angular zone.

Figure 6:
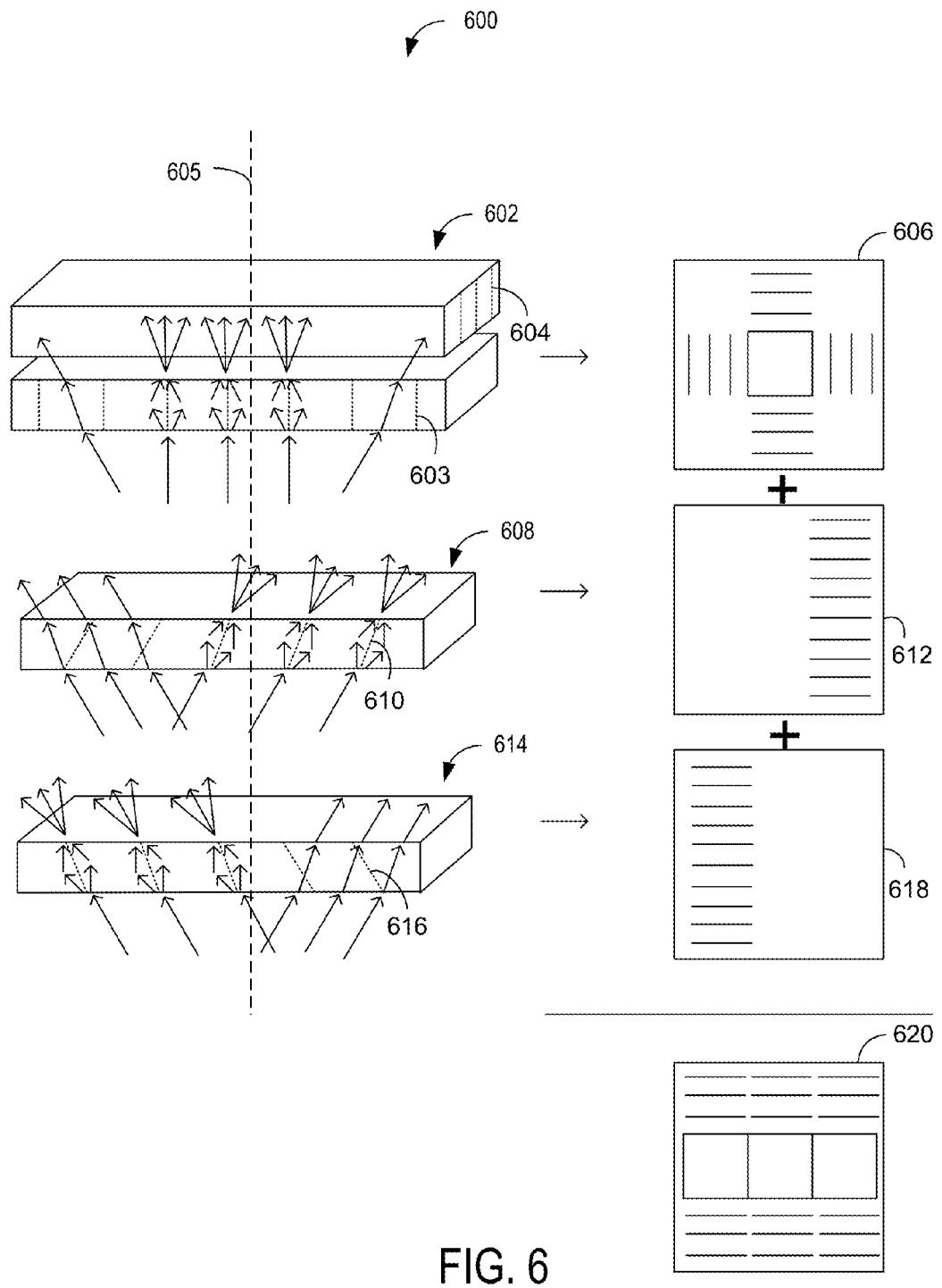
FIG. 6 shows example graded index film layers configured to diffuse and homogenize light.

FIG. 6 shows example angle-dependent diffusing film layers that may be laminated and/or otherwise combined to form an angle-dependent diffuser 600, which may be used as diffuser layer 214 of FIG. 2. Each angle-dependent diffusing layer in the diffuser 600 may be configured to diffuse and homogenize light incident on the layer within a solid angle of acceptance, while transmitting light outside of the solid angle of acceptance with little or no diffusion. As mentioned above, such a diffuser may be formed from one or more graded index, or patterned-index, diffuser layers that each includes a periodically varying or randomly varying refractive index formed in one or more films. It will be understood that the term "periodically varying refractive index" represents that the refractive index includes a plurality of alternating higher and lower index regions, and is not meant to imply any particular spacing between the regions. For example, the regions may have randomized spacing and/or an average overall spacing, such as a correlation width. Such films may be made thick enough relative to average spacing of the refractive index grading as to induce a guiding effect similar to that achieved by fiber-optic faceplates for incident light within the solid angle of acceptance. However, in contrast to such fiber optic faceplates, which may be formed from hexagonally packed rods with cladding, one-dimensional index gratings may be provided. Further, in some implementations, two crossed-layers of film each having a graded index profile across the grating dimension of the film may be utilized to achieve homogenization/diffusion in two dimensions.

A graded index film may be formed from any suitable material or materials As a graded index layer may be considered to be a volume diffuse homogenizer, examples of suitable film materials include, but are not limited to, media comprising a mix of chemicals which dissociate or migrate upon exposure to ultraviolet (UV) light such that regions of high refractive index and regions of low refractive index are formed upon exposure such as LINTEC diffuser film (available from Lintec of America, Inc., Phoenix, Ariz.), holographic film-based graded index diffusers formed by recording appropriate light intensity variation into holographic film such as BAYER holographic film (available from Bayer Material Science, LLP, Pittsburgh, Pa.) or DUPONT HR film (available from DuPont Wilmington, Del.) to form a randomized array of high index and low index within the volume of media to comprise the homogenizing diffuser in one or more holographic diffuser layers, and other films which may form structured refractive index such that the film has a low index and a high index and an average index within the layer to achieve a light guiding and diffusing function.

The graded index film layer 602 of FIG. 6 includes a plurality of different sub-layers each configured to diffuse and homogenize light within different solid angles of acceptance. First, graded index film layer 602 comprises includes a first plurality of graded index elements 603 that traverse across graded index film layer 602 along one dimension. The graded index film layer 602 further includes a second plurality of graded index elements 604 that traverse across graded index film layer 602 along one dimension. The diffusion and homogenization of light by graded index elements 603 is illustrated via rays; it will be understood that graded index elements 604 may have a similar effect in an orthogonal direction.

In the depicted embodiment, graded index elements 603 and graded index elements 604 are formed in separate layers and may be arranged orthogonal or transverse to one another. By arranging the two graded index film layers in such a manner, the output exit cone of the film may be essentially rectilinear in shape, such as square, as shown in the representation of the output effect 606 in angle space of the crossed linear graded index film layer 602. In some examples, the index spacing between each graded index element of the graded index elements 603 and 604 may be equal across the length and/or width of the respective film layer, and may be a suitable spacing, including but not limited to 3 µm, a range corresponding to correlation width suitable for high resolution displays, such as 2 µm to 9 µm, and/or any other suitable spacing. In other examples, the index spacing between each graded index element may vary across a width and/or length of the respective film layer. For example, the index spacing may decrease towards the center of the film layer. In some examples, the average grating vector may vary across a width and/or length of the respective film. For example, the grating vector may be parallel to the diffuser film layer near center of the film, and may tilt in to or out of the diffuser film layer for positions away from center, as to enable a variation of the angular bias of output solid angle versus position across the film.

In other examples, graded index film layer 602 may comprise a rectilinear index cell comprising a single film graded along two dimensions to provide rectilinear output within a single layer. A single, rectilinear index cell film may be advantageous when thickness is a consideration, as each film may be on order of a 10-100 μm depending on film technology.

Continuing with FIG. 6, graded index film layer 608 may include graded index elements 610 arranged transversely with respect to the optical axis 605. As such, graded index film layer 608 may form or contribute to the formation of an eye box to one side of the eye box formed by graded index film layer 602, as shown at 612. Likewise, graded index film layer 614 may include graded index elements 616 arranged transversely with respect to the optical axis 605 and the graded index elements 610. As such, graded index film layer 614 may form or contribute to the formation of an eye box to an opposite side of the eye box formed by layer 602 as that formed by layer 608, as shown at 618. Accordingly, when each graded index film layer 602, 608, and 614 is utilized together (e.g., as a multilayer diffuser) in combination with a wide mode light source, the combined effect in angle space is the wide angle mode eye box illustrated by the representation of the output effect 620 in angle space of the combined diffusing layers 602, 608, and 614. Likewise, when a narrow mode light source is used, the light may not be within the solid angle of acceptance of film layers 608 and 614, resulting in just the narrow mode eye box being displayed. It is to be understood that in some embodiments, the graded index film layer 608 and the graded index film layer 614 may comprise two graded index films that may be considered part of a single graded index film layer, as the two form two portions of a same eye box.

Figure 7:
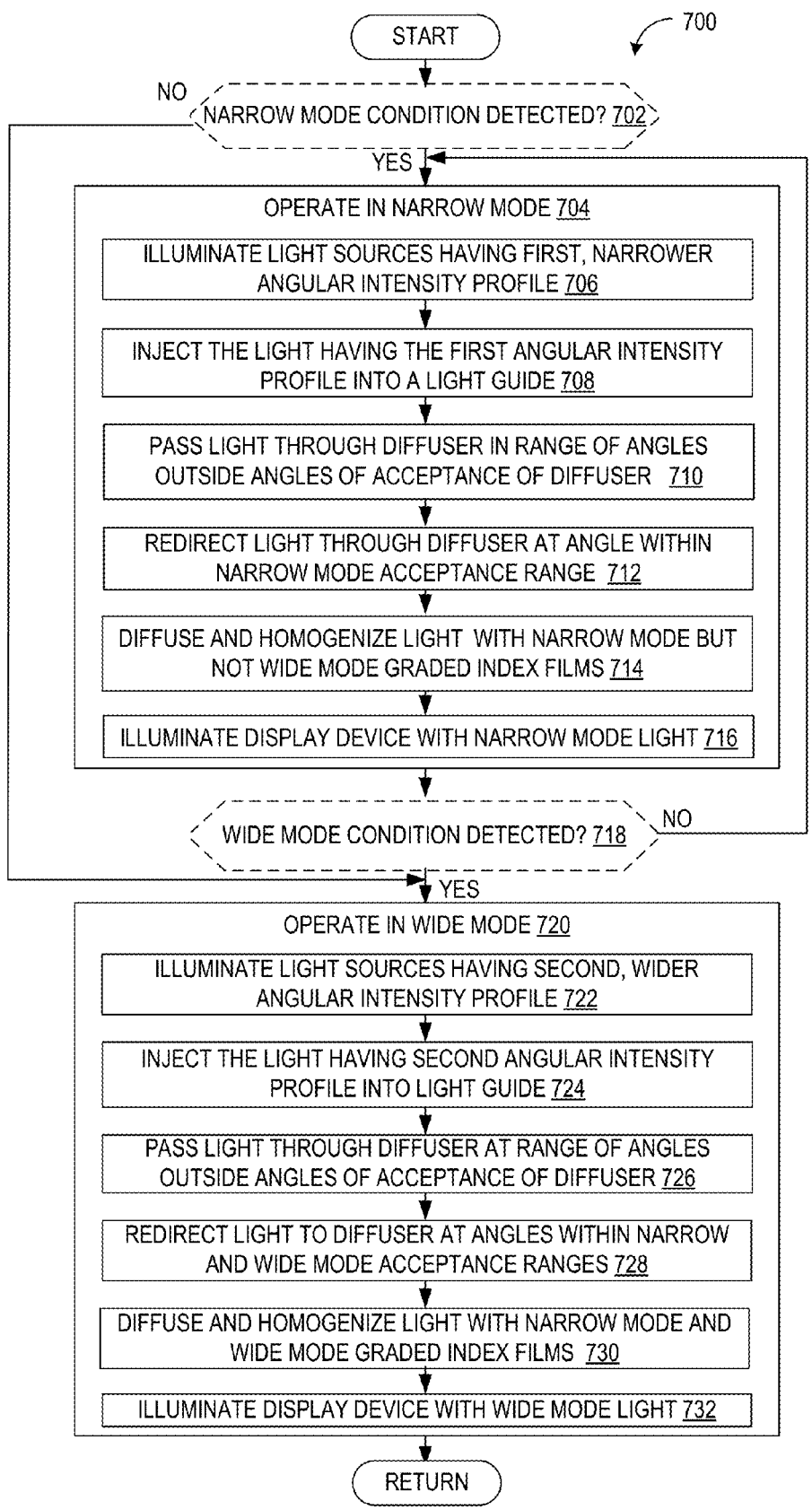
FIG. 7 shows a flow diagram illustrating an example method of operating a display device.

FIG. 7 shows a flow diagram illustrating an example of a method 700 for operating a switchable backlight unit of a display device, such as backlight unit 200a of FIG. 2. At 702, method 700 optionally includes detecting whether a narrow mode condition is present. For example, a narrow mode condition may be detected responsive to user input requesting the narrow mode, sensor data indicating a presence of a single user viewing the display device, a control signal received at the backlight unit/light sources of the backlight unit indicating a narrow mode initiation, etc. If a narrow mode condition is detected or a narrow mode is otherwise activated (e.g., "YES" at 702), method 700 proceeds to 704 to operate in the narrow mode. Operating in the narrow mode may include illuminating one or more light sources having a first, narrower angular intensity profile, as indicated at 706, to inject the light having the first, narrower angular intensity profile into a light guide, as shown at 708.

Further, method 700 includes at 710, receiving light of the first, narrower angular intensity profile at an angle-dependent diffuser at a second range of angles that is outside of a solid angle of acceptance of each of a plurality of index gratings of the angle-dependent diffuser and passing the light through the diffuser without diffusion or homogenization, and then at 712, redirecting the light back through the angle-dependent diffuser via a redirective element at one or more angles within the solid angle of acceptance of the narrow mode graded index films. Further, method 700 includes, at 714, diffusing and homogenizing light via the narrow mode graded index film(s), but not the wide mode index gratings (due to the light being outside of the acceptance angles of those index gratings). At 716, method 700 includes illuminating a display device with the narrow mode light. In this manner, the diffused and homogenized light may form a narrow mode eye box (e.g., eye box 502 of FIG. 5) that enables a viewer within the narrow mode eye box region to perceive the output image.

At 718, method 700 includes determining whether a wide mode condition is detected. If a wide mode condition is not detected (e.g., "NO" at 718), the method returns to 704 to continue operating in the narrow mode. Conversely, if a wide mode condition is detected (e.g., "YES" at 718) and/or if a narrow mode condition is not detected at 702 (e.g., "NO" at 702), then method 700 proceeds to 720 to operate in the wide mode. This may comprise, for example, illuminating one or more light sources having a second, wider angular intensity profile, as indicated at 722, to inject the light having the second angular intensity profile into the light guide, as shown at 724.

Further, method 700 includes at 726, receiving light of the second, wider angular intensity profile at an angle-dependent diffuser at a second range of angles that is outside of a solid angle of acceptance of each of a plurality of index gratings of the angle-dependent diffuser, and passing the light through the diffuser without diffusion or homogenization. Further, at 728, method 700 comprises redirecting the light back through the angle-dependent diffuser via a redirective element at angles within the narrow mode and wide mode acceptance ranges. Method 700 additionally includes, at 730, diffusing and homogenizing light with the narrow angle mode index gratings, and with one or more wide mode index gratings. At 732, method 700 includes illuminating a display device with the light. In this manner, the diffused and homogenized light may form a wide mode eye box (e.g., eye box 506 of FIG. 5) that enables one or more viewers within the wide mode eye box region to perceive the output image.

Thus, the disclosed embodiments may provide for the display of images within different eye boxes in a manner that provides for a flat-topped intensity distribution across each eye box, and also sharp transitions at the edge of each eye box. This may help to provide for good viewing experiences in both private and non-private viewing modes.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
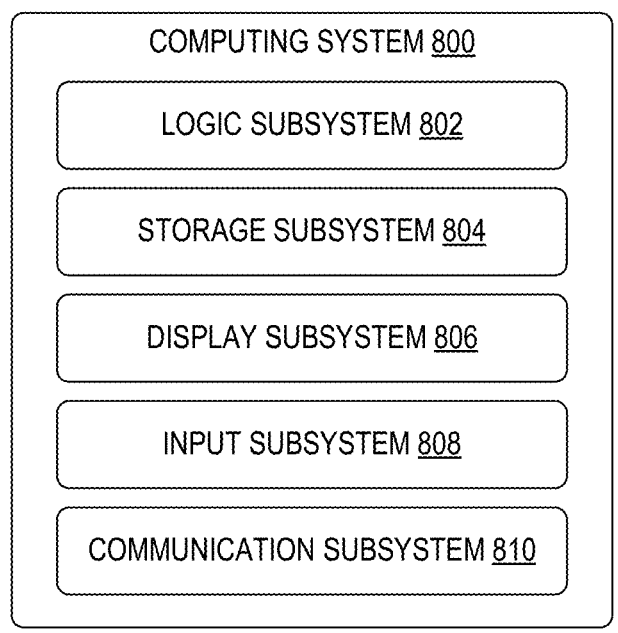
FIG. 8 shows a block diagram of an example computing device.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 further includes a display subsystem 806, and may optionally include an input subsystem 808, communication subsystem 810, and/or other components not shown in FIG. 8.

Logic machine 802 includes one or more physical devices configured to execute instructions. For example, the logic machine may be configured to execute machine-readable instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.), as opposed to being stored via a storage machine.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices. The display subsystem 806 also may include backlight systems as described herein, including but not limited to one or more graded index films, light sources with different angular intensity profiles, etc.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A backlight unit comprising:
   a light guide configured to receive light at a first light interface located at an end of the light guide and output light via a second light interface located at a face of the light guide;
   a plurality of light sources configured to inject light into the light guide at the first light interface, each light source of the plurality of light sources being configured to selectively emit light having at least one of an intensity profile having a narrower distribution relative to an optical axis of the backlight unit, and an intensity profile having a wider distribution relative to the optical axis; and
   an angle dependent diffuser layer comprising a first graded index film and a second graded index film, each of the first graded index film and the second graded index film configured to receive light from the second light interface of the light guide, the first graded index film being configured to homogenize received light that is incident on the graded index film from within a first range of acceptance angles corresponding to the intensity profile having a narrow distribution, and not homogenize light incident on the graded index film from outside of the first range of acceptance angles, and direct the received light that is homogenized by the first graded index film toward a first eye box, and the second graded index film being configured to homogenize received light that is incident on the graded index film from within a second range of acceptance angles corresponding to intensity profile having a wide distribution, and not homogenize light incident on the graded index film from outside of the second range of acceptance angles, and direct the light that is homogenized by the second graded index film toward a second eye box.

2. The backlight unit of claim 1, wherein the first eye box is a narrow-angle eye box, and the second eye box is a wide-angle eye box.

3. The backlight unit of claim 2, wherein the plurality of light sources comprises a first subset of the plurality of light sources configured to emit light in the first range of acceptance angles corresponding to the narrow-angle eye box and a second subset of the plurality of light sources configured to emit light in the second range of acceptance angles corresponding to the wide-angle eye box.

4. The backlight unit of claim 3, wherein the first subset of the plurality of light sources is configured to emit light responsive to a narrow viewing mode trigger and wherein the second subset of the plurality of light sources is configured to emit light responsive to a wide viewing mode trigger.

5. The backlight unit of claim 2, wherein the second eye box is wider than the first eye box.

6. The backlight unit of claim 2, wherein the second eye box is formed from homogenized light from the first graded index film and homogenized light from the second graded index film.

7. The backlight unit of claim 1, wherein the light guide comprises one or more of a wedge-shaped light guide and a Fresnelated plate.

8. The backlight unit of claim 1, further comprising a redirecting element configured to receive light from the plurality of light sources via the graded index film, turn the received light, and direct the turned light back toward the graded index film.

9. A backlight unit for a display device, the backlight unit comprising:
a wedge shaped light guide configured to receive light at a first light interface located at an end of the light guide and output light via a second light interface located at a face of the light guide;
a plurality of light sources configured to inject light into the light guide at the first light interface, the plurality of light sources being configured to selectively emit light having a first intensity profile having a narrower distribution relative to an optical axis of the backlight unit, and light having a second intensity profile having a wider distribution relative to the optical axis;
a first graded index film configured to receive light from the light guide, homogenize and diffuse light having a first angular acceptance range corresponding to the first intensity profile, and not homogenize and diffuse light having an acceptance range outside of the first angular acceptance range, and direct the homogenized and diffused light toward a first eye box at a first location; and
a second graded index film configured to receive light from the light guide, homogenize and diffuse light having a second angular acceptance range corresponding to the second intensity profile, and not homogenize and diffuse light having an acceptance range outside of the second angular acceptance range, and direct the homogenized and diffused light toward a second eye box at a second location.

10. The backlight unit of claim 9, wherein the first graded index film and the second graded index film are arranged in a stack.

11. The backlight unit of claim 9, wherein the second graded index film comprises a first graded index layer having indices arranged along a first direction transverse to an optical axis, and a second layer of graded indices arranged along a second direction that is transverse to the first direction and to the optical axis.

12. The backlight unit of claim 11, wherein the first graded index layer and the second graded index layer direct light toward different portions of the second eye box.

13. The backlight unit of claim 9, further comprising a redirective element configured to receive light from the plurality of light sources that passes out of the wedge-shaped light guide and through the first and second graded index films without being homogenized and diffused, to redirect the received light toward the first and second graded index films to homogenize and diffuse light within the first angular acceptance range and the second angular acceptance range, and to redirect the homogenized and diffused light through the wedge-shaped light guide.

14. A display device comprising:
a display panel; and
a backlight unit configured to illuminate the display panel, the backlight unit comprising
a wedge shaped light guide configured to receive light at a first light interface located at an end of the light guide and output light via a second light interface located at a face of the light guide,
a plurality of light sources configured to inject light into the light guide at the first light interface, the plurality of light sources being configured to selectively emit light having a first intensity profile having a narrower distribution relative to an optical axis of the backlight unit during a narrow viewing mode, and light having a second intensity profile having a wider distribution relative to the optical axis during a wide viewing mode, and
a first graded index layer configured to receive light from the light guide, homogenize and diffuse light having a first angular acceptance range corresponding to the first intensity profile, and not homogenize and diffuse light having an acceptance range outside of the first angular acceptance range, and direct the homogenized and diffused light toward a first eye box at a first location, and
a second graded index layer configured to receive light from the light guide, homogenize and diffuse light having a second angular acceptance range corresponding to the second intensity profile, and not homogenize and diffuse light having an acceptance range outside of the second angular acceptance range, and direct the homogenized and diffused light toward a second eye box at a second location.

15. The display device of claim 14, wherein the first graded index layer comprises a first graded index film and a second graded index film, the first graded index film being arranged orthogonally to the second graded index film.

16. The display device of claim 14, wherein the first graded index layer comprises a single graded index film that is graded along two dimensions.

17. The display device of claim 14, wherein the first eye box is narrower than the second eye box.

18. The display device of claim 14, wherein the second graded index layer comprises two graded index films, each of the two graded index films comprising graded indices having a direction transverse to the optical axis.

19. The display device of claim 14, wherein the backlight unit further comprises a redirective element configured to receive light from the plurality of light sources that passes out of the wedge-shaped light guide and through the first and second graded index layers and to redirect the received light toward the first and second graded index layers and through the wedge-shaped light guide.

20. The display device of claim 14, wherein the backlight unit further comprises a cladding layer positioned between the light guide and the first and second graded index layers along the optical axis.

* * * * *